OR 2,644,942

SEARCH ROOM

6

X 5198R
T358-86
X370-40
X5308T
SD

July 7, 1953 — A. V. BEDFORD — 2,644,942

TELEVISION CARRIER CONTROL SYSTEM

Filed March 18, 1949 — 4 Sheets-Sheet 1

T to class 358
X back to 370

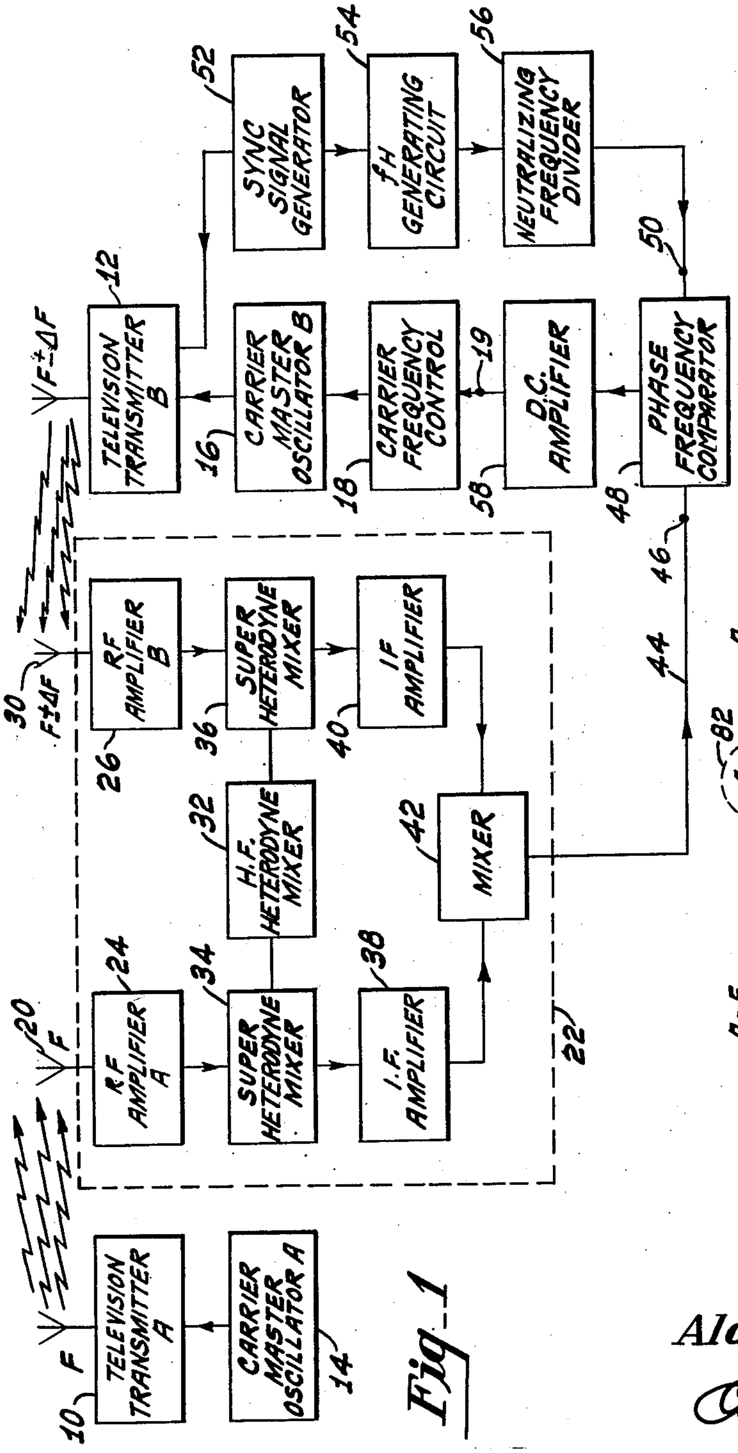

Fig. 1

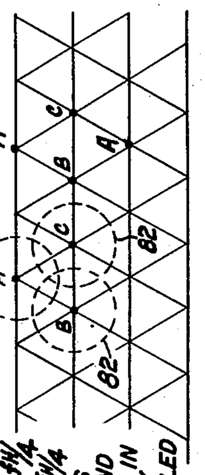

A: F
B: F+fH/4
C: F-fH/4

NOTE: TELEVISION TRANSMITTERS A & B IN FIG. 5 CORRESPOND TO TRANSMITTERS A & B IN FIG. 1 AND ARE SIMILARLY COMPARED AND CONTROLLED IN FREQUENCY.

Fig. 5

NOTE: TRANSMITTERS A B C IN FIG. 5 ARE COMPARED AND CONTROLLED IN FREQUENCY IN THE SAME MANNER AS ARE TRANSMITTERS A & B IN FIG. 1, TRANSMITTER C IN FIG. 5 BEING SIMILAR TO TRANSMITTER B IN FIG. 1.

INVENTOR
Alda V. Bedford
BY [signature]
ATTORNEY

TELEVISION CARRIER CONTROL SYSTEM

INVENTOR
Alda V. Bedford
BY
[signature]
ATTORNEY

July 7, 1953 A. V. BEDFORD 2,644,942

TELEVISION CARRIER CONTROL SYSTEM

Filed March 18, 1949 4 Sheets-Sheet 3

INVENTOR
Alda V. Bedford
BY
[signature]
ATTORNEY

TELEVISION CARRIER CONTROL SYSTEM

Filed March 18, 1949 4 Sheets-Sheet 4

INVENTOR
Alda V. Bedford
BY Olin J. Mitchell
ATTORNEY

Patented July 7, 1953 2,644,942

UNITED STATES PATENT OFFICE 2,644,942

TELEVISION CARRIER CONTROL SYSTEM

Alda V. Bedford, Princeton, N. J., assignor to Radio Corporation of America, a corporation of Delaware Application March 18, 1949, Serial No. 82,034

11 Claims. (Cl. 343—208)

The present invention relates to radio transmission systems in which two or more adjacent radio transmitters operating on the same transmitting channel tend to produce signal interference between each other.

In more particularity, the present invention concerns itself with a carrier frequency control system for a plurality of television transmitters operating on a common television channel but situated at different geographical locations positioned sufficiently close to one another to produce reception zones in which the common channel carrier signals from one transmitter measurably influence and interfere with the satisfactory reception of another common channel carrier signal.

The present invention also deals with additional reduction in co-channel television signal interference of a type described in a co-pending U. S. patent application by Alda V. Bedford and George C. Sziklai entitled "Radio Carrier Synchronization System," Serial No. 73,514, filed January 29, 1949, now Patent No. 2,536,255, dated January 2, 1951, in which reduction of co-channel interference was accomplished through the application of a novel radio transmitter carrier isochronization system.

As pointed out in the above-identified application, there has arisen, with the growth of the television art, the desire to construct ever-increasing numbers of television stations in given geographical areas, particularly around centers of large population. Inasmuch as the frequency allocations for television service are limited in number, it has been often necessary to assign two or more transmitters, serving a common area, a common television channel. This necessity has resulted in creation of reception zones in which signals from the common channel transmitters interfere with one another to produce disturbing interference patterns in television images received in such zones. Although an effort has been made to carefully select the geographical locations of such co-channel stations to minimize the population included in zones likely to suffer from such co-channel interference, there is a rapidly growing number of television receiver owners who suffer from such interference.

Many efforts have been extended to reduce such interference by utilizing directive antennas at the receiving locations so as to directively discriminate against the unwanted carrier by proper orientation of the antenna. However, even with the most carefully adjusted and elaborately designed antenna arrays, there still remain areas in which satisfactory reception of co-channel television transmitters is difficult or impossible. In addition, directive antennas are usually objectionable because of their rather high cost and large size.

It is well known that the visible interference effects produced between two co-channel television stations may be thought of as falling into two categories; the first and more prominent interference effect is that produced by the random frequency difference or beat between the involved stations and manifests itself as a series of annoying horizontal bars in the background of the desired reproduced image, the bars generally moving in the vertical direction. These horizontal bars comprise what is commonly referred to as the "Venetian blind interference" pattern and is apparent as interference in the picture long before the picture or video information transmitted by the interfering carrier appears in the background of the desired picture. The second form of interference is that produced by the actual video information of the unwanted signal being superimposed upon the desired image signal and is usually seen as either an undesirable image floating in the background of the desired picture or as a fluttering change in background brightness of the desired image. This latter form of interference may be called "video interference" in contradistinction to the "Venetian blind interference."

In the above-cited co-pending application it was shown that the horizontal bar or "Venetian blind interference" could be substantially eliminated by synchronizing the radio carriers of the two co-channel television stations with one another. For example, through exact synchronization of picture carriers, it has been found that the visibly interfering carrier signal may be increased in intensity by a factor between 5 and 10 times in voltage without producing serious overall interference in the desired image. However, although the "Venetian blind interference" may be virtually eliminated by this synchronization method, the "video" or second form of interference, caused by the actual video signal information of the unwanted carrier, is not necessarily eliminated and may by itself produce intolerable interference effects.

The present invention provides a method and means for reducing co-channel television interference by maintaining a fixed frequency difference between the adjacent co-channel stations of a value that will cause successive interference beats to optically cancel one another in the reproduced image so that high and low intensity sections of the "Venetian blind interference" pattern, as well as the "video" interference, will through persistence of the observer's vision neutralize or "average out" and hence become unobjectionable. Through the assignment of discrete frequency differences, which result in the reduction of both "Venetian blind" and "video" interference, the present invention further permits the concomitant operation of co-channel television stations in some areas ordinarily restricted to but one transmitter on the involved channel.

It is therefore an object of the present invention to provide a system for operating co-channel television stations which will substantially reduce interference effects produced by differences in carrier frequency as well as by a superimposition of video signal information from the unwanted station upon the desired image.

Another object of the present invention resides in the provision of a new and improved method for so relating the radio carrier frequencies of two television transmitters assigned for operation on a single television channel as to extend the effective service areas of the stations involved.

It is still another object of the present invention to provide a new and novel method for maintaining a frequency difference relationship between two sources of periodically recurrent signals in accordance with a third source of periodically recurrent signals.

It is another purpose of the present invention to provide an effective and novel method for maintaining a fixed frequency difference between two radio transmitters geographically separated from one another.

It is another purpose of the present invention to provide a system for controlling the carrier frequencies of a plurality of co-channel television stations such that any carrier interference produced between the stations will be productive of a video interference pattern having a self-neutralizing characteristic and hence will be of a substantially less disturbing nature.

A still further object of the present invention resides in the provision of a carrier frequency assignment schedule for co-channel television stations which will greatly increase the permissible number of such co-channel stations permitted to operate in a given service area.

Another object of the present invention is to provide novel electronic monitoring and control arrangements for carrying out the objects of the present invention.

A more detailed understanding of the present invention, its mode of operation, as well as other objects and features of advantage in addition to those set forth hereinabove will become apparent with the reading of the following specification, especially when taken in connection with the drawings in which:

Figure 1 shows one embodiment of the present invention;

Figure 2 graphically represents the type of interference schedule produced in accordance with the present invention;

Figure 5 illustrates the application of the present invention to a network of adjacent co-channel stations;

Figure 6:
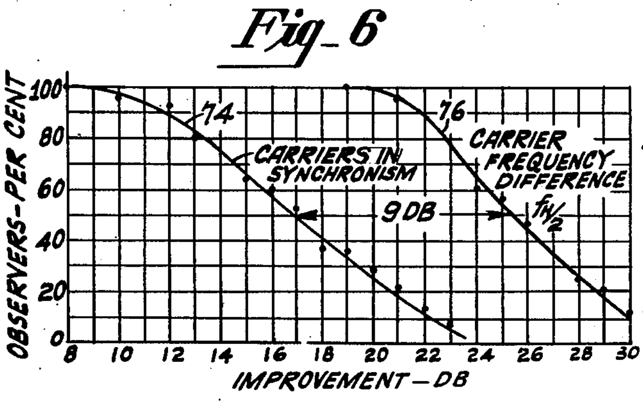
Figure 7:
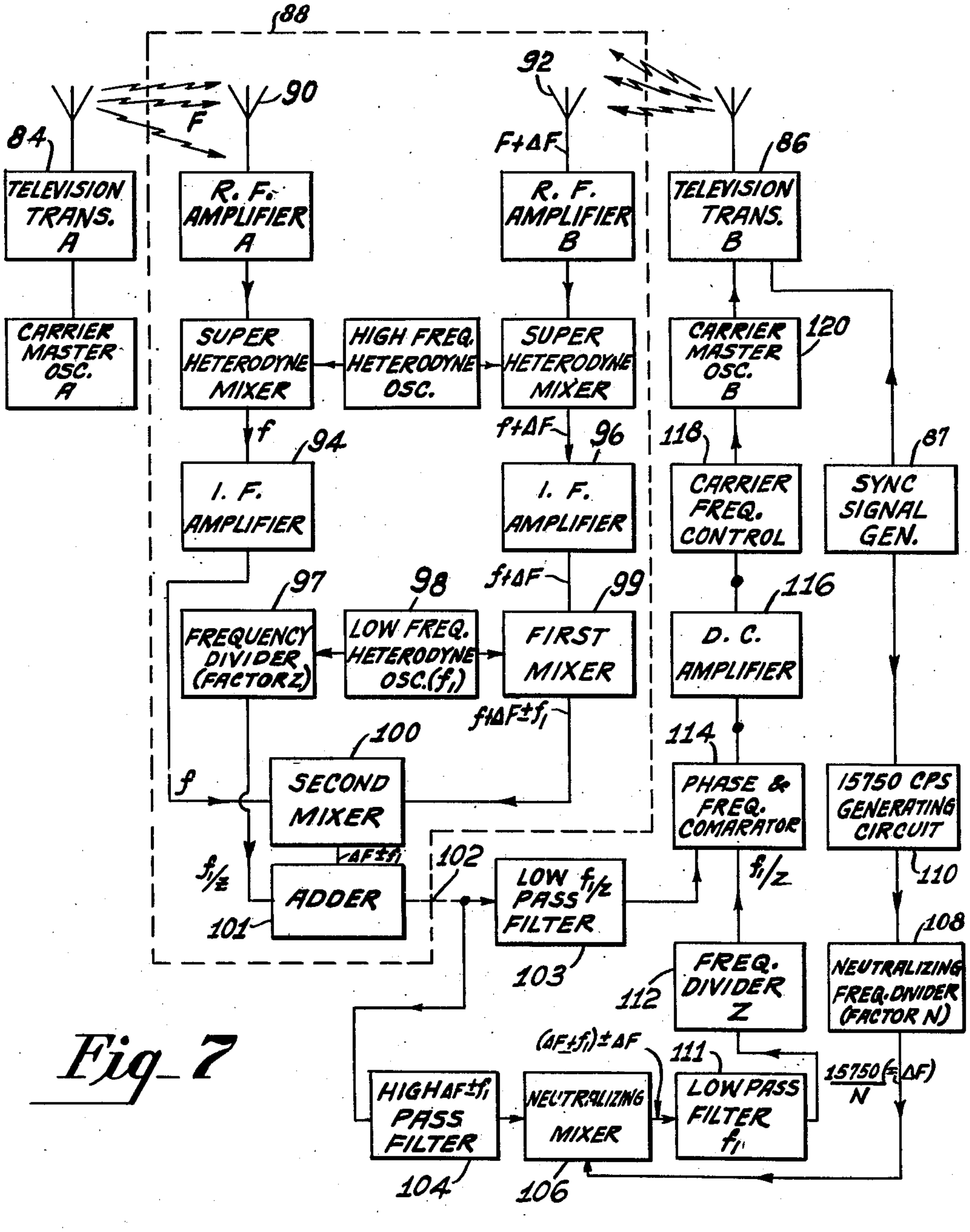

Figure 6 graphically represents the interference reduction effects of the present invention;

Figure 7 shows another embodiment of the present invention; and

Figure 8:
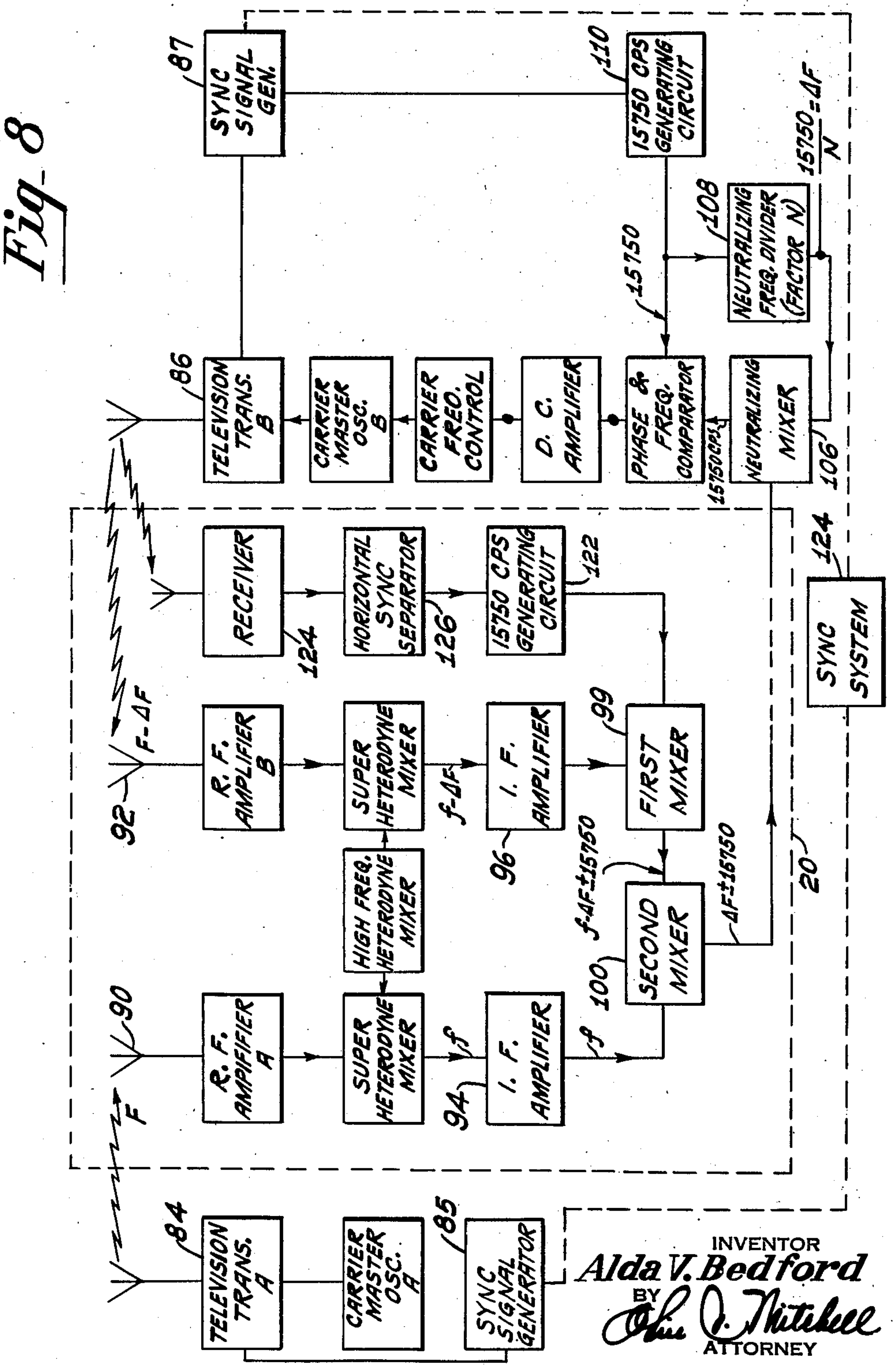

Figure 8 shows still another embodiment of the present invention.

Referring now to Figure 1, there are shown in blocks 10 and 12 respectively, two geographically separated television transmitters A and B designated for operation on a common television channel. Details of typical transmitter arrangements suitable for use in blocks 10 and 12 are described at length in an article entitled "RCA Television Transmitter," Article #153, RCA Victor Press Division, Camden, New Jersey. It will be assumed for purposes of description, that the carrier frequency of the television transmitter A is established by a carrier master oscillator such as 14 and with the exception of the normal drifting of such an oscillator, the carrier A maintains a substantially constant frequency F on the assigned television channel. Television transmitter B, on the other hand, is provided with a carrier master oscillator such as 16 which is controllable in frequency and phase by means of a carrier frequency control 18. The carrier frequency control 18 may take many forms well known in the art such as a mechanical adjustment of a trimmer capacitance, which may be associated with the master oscillator 16 or it may take the form of a well known reactance tube circuit connected in shunt with a resonant circuit determining the frequency of the oscillator 16. In the present showing, it will be assumed that the carrier frequency control 18 will be influenced by means of a D. C. control voltage applied to the terminal 19 thereof. For example, the control 18 may be a reactance tube circuit, controlled by a direct current control voltage, as described in Travis Patent No. 2,294,100, August 25, 1942, or in Travis Patent No. 2,357,984, September 12, 1944.

According to the present invention, it is desired to maintain a fixed frequency difference of a predetermined value between the carriers of the television transmitter A and of the television transmitter B in order to minimize or reduce the interference effects produced in the reception zones wherein the signal strengths of each of the co-channel transmitters are sufficient for reception. As indicated hereinabove, maintenance of a fixed frequency difference, between two co-channel stations, of a value in accordance with the teachings of the present invention, results in the reduction of both the "Venetian blind" interference effect and the "video" interference effect. The exact mode of operation of the cancellation system will be hereinafter more fully described with respect to Figures 2, 3, and 4. However, for the instant consideration, it is important to understand the operation of the system of Figure 1, which operates to maintain any given fixed frequency difference between the two transmitters and, of course, may be adapted for maintaining a fixed frequency difference between any similar types of signal generating circuits.

This arrangement in Figure 1 illustrates means for maintaining a fixed carrier difference of $\Delta F$ between the television transmitter A and television transmitter B through the use of a remote monitoring station shown in the dotted line area 22. This monitoring station may include a first and second RF amplifier 24 and 26, each having a directive antenna 20 and 30 directed for pick up of carrier energy from the respective transmitters 10 and 12. The outputs of the RF amplifiers 24 and 26 are mixed with the output of a local high frequency oscillator 32 by means of the superheterodyne mixers 34 and 36 to produce respective intermediate frequencies for amplification by the IF amplifiers 38 and 40. Therefore, the output signal of the IF amplifier 38 will represent the carrier A while the IF signal appearing at the output of the IF amplifier 40 will represent the television transmitter B carrier. It will be noted that with such an arrangement, a one cycle per second change in either of the carriers A or B will produce a one-cycle change in the output frequency of the corresponding IF amplifier. The outputs of the IF amplifiers 38 and 40 are applied to a non-linear mixing circuit 42 which will develop an indicating signal whose frequency represents the "beat" or difference frequency between the two carriers A and B. Accordingly, to control and fix this difference, this indicating signal is transmitted by suitable means such as the line 44 to one input terminal 46 of a phase and frequency comparator circuit 48 located at television transmitter B. The indicating signal so applied is compared with an interference "neutralizing" signal applied to the other terminal 50 of the phase and frequency comparator. The comparator 48 may, for example, be of the conjugate-input type described in Pomeroy Patent No. 2,288,025, dated June 30, 1942, and functions to produce a direct current output voltage proportional to the frequency difference between the two signals applied to its input terminals 46 and 50. In accordance with the form of the present invention shown in Figure 1, the neutralizing signal is derived from the synchronizing signal generator 52 associated with television transmitter B. An output signal developed by the sync signal generator 52 is applied to a horizontal line frequency ($f$H) generating circuit 54 whose output will be in synchronism with the horizontal or line scanning component of the transmitted television image. The frequency of the neutralizing signal is then established at a value in accordance with the present invention by the neutralizing frequency divider 56 which divides down the line scanning frequency developed by the generating circuit 54 and applies the same to the terminal 50 of the phase and frequency comparator 48. The frequency divider 56 may be of any well-known type, such as the binary type; this divider is termed a "neutralizing" frequency divider simply because the divided frequency at the output of divider 56 (which is equal to the desired frequency difference between the two carriers) is sufficient to "neutralize" the types of co-channel television signal interference previously described.

From the arrangement in Figure 1, it can be seen, assuming the television transmitter B carrier is initially established on a particular side but on either side (either above or below the frequency) of the carrier F of television transmitter A, that the output of the phase and frequency comparator 48 acting through the D. C. amplifier 58 will influence the carrier frequency control 18 to maintain a set frequency difference between the two carriers, of a value depending upon the actual signal frequency appearing at the output of the neutralizing frequency divider 56.

Figure 2:
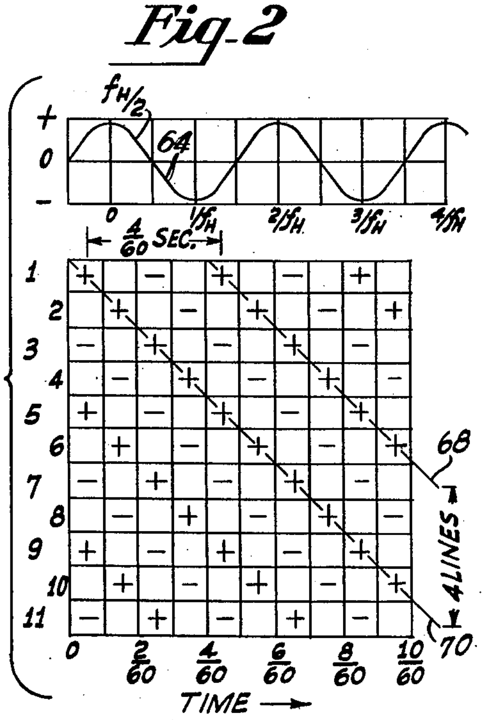
Figure 3:
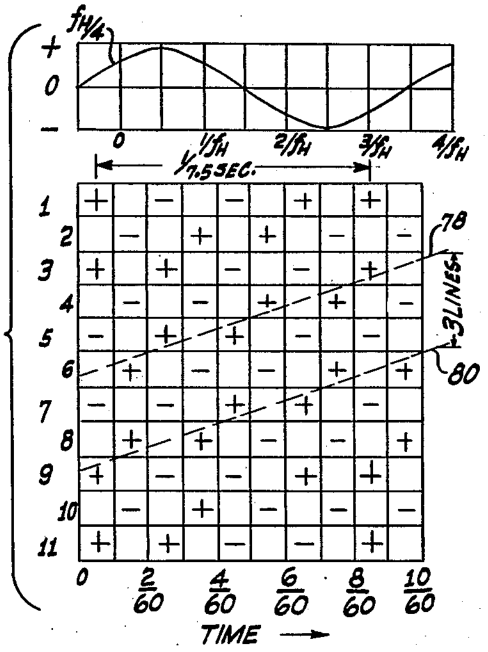
Figure 3 is another interference schedule in accordance with the present invention.
Figure 4:
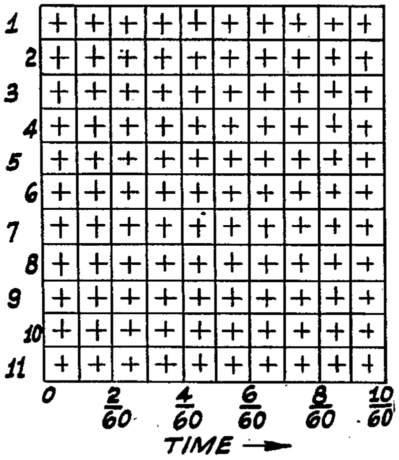
Figure 4 represents a schedule of interference under conditions of exact synchronism between two co-channel carriers.

Having provided means for maintaining a fixed frequency difference between the two carriers of transmitters A and B, let the effects of such carrier frequency difference be more fully analyzed from the standpoint of the results that such a difference will produce in the reproduced television image. Figures 2, 3, and 4 are therefore provided and represent relative polarity schedules of interference horizontal line by horizontal line, for successive values of interlaced television rasters. For instance, in Figure 2, the abscissa represents time plotted as increasing from left to right in increments of $1/60$ and hence corresponds to successive vertical field scansion in a standard television raster. Starting from the top of the ordinate and going in the vertically downward direction, there is numerically indicated the even and odd lines scanned during successive fields. For example, lines 1, 3, 5, etc. through 11 are scanned during the first $1/60$ of a second while the odd lines 2, 4, 6, etc. through 10 are scanned during the second $1/60$ of a second. As well known the successive scansion and interlacing of an even numbered set of lines with an odd numbered set of lines constitutes one image frame which is in turn repeated at a presentation rate of 30 frames per second. The positive and negative polarity indications in the individual squares of the interference schedule represent the relative polarity of the interference effects of the line with which the square is associated for the particular value scansion with which it is associated. More specifically, a positive indication in a given square may be interpreted as meaning that the corresponding raster line will be increased in intensity by positive excursions of the received interfering signal as detected whereas a negative indication will be construed as meaning that the same positive excursions of the interfering signal as detected will be productive of corresponding reductions in brilliance of sections of that image line. Figures 3 and 4 show similar representations for different carrier frequency relations.

The image interference schedule presented by Figure 2 is based upon a fixed frequency difference between the carriers equal to ½ the horizontal line frequency designated $f$H, this line frequency in standard systems being equivalent to 15,750 C. P. S. The phase of the beat or indicating signal appearing at the output of the mixer 42 in Figure 1 will then appear as shown at 64 (Figure 2) based upon the scale having marked increments thereon from left to right corresponding to horizontal line scanning frequency periods, i. e., 0, $1/f$H, $2/f$H, $3/f$H, etc. It is clear that lines 1, 3, 5, etc. may then correspond to the horizontal intervals 0, $1/f$H, $2/f$H, etc. on the time base whereas the even lines 2, 4, 6, etc. would correspond to the time intervals $6/f$H, $7/f$H, $8/f$H, etc. on an extension of the time base. With the frequency difference beat 64 equal to $f$H/2 or $\frac{1}{2} \times 15{,}750 = 7875$ C. P. S., it can be seen that successive odd and successive even line fields will manifest opposite polarities of interference. For example, looking at the difference or beat signal 64, interval 0 corresponding to line 1 will be positive while interval $1/f$H corresponding to line 3 will be negative, line 5 positive, line 7 negative, etc. This schedule will then be seen to produce alternation of interference polarity throughout successive fields of a given line and in accordance with the present invention this will tend to average out the interference effects and through persistence of eye vision such effects will become neutralized and substantially unobjectionable. Moreover, it is seen that the resulting interference pattern produced by the present invention causes adjacent horizontal lines in a given field to exhibit opposite polarity effects so that any 15 cycle flicker effect is reduced to a minimum.

This latter point can be appreciated by considering that lines 1 and 3 during the first field scansions are of opposite polarity as well as lines 5 and 7 and lines 9 and 11. Correspondingly, during the second field scansion, lines 2 and 4 and lines 6 and 8 have opposite interference polarity. Thus, the small raster area represented by two horizontal lines separated from one another by one line will, as far as the eye is concerned, suffer no net increase or decrease in illumination due to interference.

Examination of Figure 2 reveals the existence of a regular diagonal schedule of positive interference effects such as indicated by the dotted lines 68 and 70. This shows that for a difference or beat indicating signal of $f\mathrm{H}/2$, adjacent positive diagonals are 4 lines apart for a 525 line raster. This means, as indicated by the time interval indicated at the upper part of the diagram, that the interference schedule per se, will repeat itself in form once every $1/15$ of a second. In so doing, the schedule effectively moves vertically in the raster field at the rate of one line per field, thereby traversing the field at intervals of approximately 8.8 seconds. In practice, it has been shown that the diagonal in this schedule moving at the rate indicated, by repeating itself every $1/15$ of a second does not produce distracting results. The movement of the schedule within the field concomitantly with the interference neutralizing effects of the schedule itself make such regularities virtually unnoticeable.

Figure 3 sets forth the interference pattern produced in accordance with the present invention for a carrier frequency difference of $f\mathrm{H}/4$. Study of Figure 4 will show that the diagonal lines of positive interference indicated by the dotted lines 78 and 80 are only 3 lines apart and that the pattern will repeat itself every $1/7.5$ seconds. In practice, this has also been found to create an acceptable rate of pattern movement with similar neutralization of interference effects by controlling the polarity of interference effects in successive fields of a given line. The arrangement in Figure 3 can be seen to have substantially all of the advantageous characteristics hereinbefore set forth in detail for the $f\mathrm{H}/2$ beat frequency of Figure 2.

In the above Figures 2 and 3, it can be seen that the "Venetian blind" effect has been substantially eliminated by maintaining the interference beat at a high enough frequency to make any evidence of beat interference occur separated by so few lines with such a rate of motion as to make it undetectable. The "video" interference between the station is cancelled as described by the switching of the polarity of such interference influence on a given line throughout successive fields.

By way of illustration and comparison, the interference pattern produced for those stations in exact synchronism with one another has been shown in Figure 4. It is herein evident that depending upon the relative phase of one carrier with respect to the other, the interference effects for a given line throughout successive fields will all be either on positive or on negative and hence will be objectionable. In Figure 4, it has been assumed that the carrier phase between the stations involved is such as to produce positive interference.

The results of an observation test witnessed by a number of unbiased observers are shown in Figure 6. The curve 74 sets forth the degree of improvement felt, by different indicated percentages of the observers, for a system such as described in the aforementioned Patent No. 2,536,255, in which the carriers between the two stations were held in exact synchronism with one another. Curve 76, however, shows that where the carrier difference is held at $f\mathrm{H}/2$ in accordance with Figure 2, the apparent improvement is approximately 9 db over that of exact synchronism.

With the interference neutralization effects of Figures 2 and 3 in mind, the present invention, therefore, also contemplates the orderly assignment of discrete operating frequency relationships between adjacent co-channel stations in accordance with an arrangement such as shown in Figure 5. For purposes of illustration, there are shown three types of co-channel stations, type A, type B and type C with respective exemplary coverage areas defined by the dotted circles 82. It will be appreciated that the equilateral matrix with which the co-stations A, B and C are shown provides the best opportunity for mutual interference so that a solution of co-channel interference for such an arrangement would, in fact, contemplate the solution of co-channel interference for virtually all co-channel interference problems that might arise. Accordingly, if as set forth by the present invention, transmitter A is assigned operating frequency F, transmitter B is assigned operating frequency $$F+\frac{F_h}{4}$$

while transmitter C is assigned $$F \text{ minus } \frac{F_h}{4}$$

there will be produced in all interference zones interference conditions typified by Figures 2 or 4, namely, there will be existent between interfering stations either a carrier frequency difference of $$\frac{F_h}{4}$$

(such as is the case between stations A and B or A and C) or a frequency difference of $$\frac{F_h}{2}$$

(such as is the case between transmitters B and C). Thus, through the use of the present invention, co-channel stations may be geographically positioned considerably closer to one another than the art has heretofore permitted.

By way of example, Figures 7 and 8 show two other convenient forms of practicing the present invention. In Figure 7, there are shown at blocks 84 and 86 respectively, two geographically separated television transmitters A and B assigned for co-channel operation as shown in Figure 1. At the intermediate monitoring location indicated in dotted line area 88, the respective signals from transmitters A and B are picked up by the antennas 90 and 92 to subsequently be heterodyned down to respective intermediate frequencies amplifiable by the IF amplifiers 94 and 96. It will be assumed in the case of Figure 7 that the television transmitter B is to be maintained, in accordance with the present invention, at a frequency $\Delta F$ higher than the television transmitter A in order to produce the interference neutralization effect. Consequently, whereas the output of the IF amplifier 94 will be $f$ (representing the IF frequency version of the carrier frequency F of transmitter A) the output of the IF amplifier 96 will be $f+\Delta F$. There is then mixed with $f+\Delta F$ a low frequency heterodyning frequency $f_1$ at 98 by means of the first mixer 99. The output of the first mixer will then contain a component $f+\Delta F\pm f_1$ which by means of the second mixer 100 is heterodyned with the output $f$ of the IF amplifier 94. The $f$ component of the first mixer output and the $f$ component delivered by the IF amplifier 94 will then cancel in one mode of combining to produce at the output of the second mixer, the signal $\Delta F\pm f_1$ The low frequency heterodyne oscillator 98 is then applied to the frequency divider 97 having a division factor Z to produce a reference signal which is combined by adder 101 with the output of the second mixer for concomitant transmission over a communication channel 102, shown by dotted lines, to the television transmitter B location. In the television transmitter B, the divided low frequency heterodyne oscillator component $f_1/Z$ is passed by a low pass filter 103 while a high pass filter 104 permits only the second mixer output component $\Delta F\pm f_1$ to be communicated to a neutralizing mixer 106. Also applied to the neutralizing mixer 106 is the output of the neutralizing frequency divider 108 which represents the division, by a factor N, of the 15,750 cycle per second output of generating circuit 110. Mixer 106 and divider 108 are preferably exactly similar to mixer 99 and divider 56, respectively; divider 108 is termed a "neutralizing" frequency divider simply because the divided frequency at the output of 108 is made sufficient to "neutralize" the cochannel interference previously described, while mixer 106 is termed a "neutralizing" mixer merely because the output of the "neutralizing" frequency divider 108 is fed thereto. As described hereinabove, in accordance with the present invention, the output of the neutralizing frequency divider 108 representing 15,750/N is to be equal to $\Delta F$ and hence its mixing with the output of the high pass filter 104 will produce at the output of the neutralizing mixer the component $f_1$. The output of the low pass filter 111 passing only $f_1$ is then divided by a frequency divider 112 also having a factor Z to produce an output signal $f_1/Z$ for the phase and frequency comparator 114. The output of the low pass filter 103 representing the $$\frac{f_1}{Z}$$

reference signal derived from the low frequency heterodyne oscillator 98 is then also applied to the phase and frequency comparator 114 for use as a standard against the $$\frac{f_1}{Z}$$

component appearing at the output of the frequency divider 112. The control of the carrier frequency is then established by means of the D. C. amplifier 116 and the carrier frequency control 118 connected between the phase and frequency comparator and the carrier master oscillator 120. The carrier frequency control 118 is preferably similar to the carrier frequency control 18, previously described.

In the foregoing arrangement of Figure 7, it is evident that once the television transmitter B carrier has been established on the correct side of the television transmitter A carrier and the polarity of control from the phase and frequency comparator 114 to the carrier master oscillator 120 is properly determined, there will be maintained between the two transmitters a fixed frequency difference equal to the output of the neutralizing frequency divider 108. The prescribed carrier difference, of course, is to be chosen in accordance with the method of the present invention hereinbefore described so as to minimize interference between the stations. The arrangement in Figure 7 is advantageous over Figure 1 in that even under conditions of initial carrier synchronism between stations, the indicating signal transmitted over the transmission line can never drop to zero and hence the control will properly impose suitable correction.

A study of the arrangement in Figure 8 will reveal it to be substantially the same as that shown in Figure 7 with a few exceptions such as the low frequency heterodyne oscillator 98 of Figure 7 having been replaced by a 15,750 cycle per second generating circuit 122 in Figure 8. The 15,750 C. P. S. generating circuit 122 is timed in accordance with the horizontal synchronizing information transmitted by the television transmitter 86 through the agency of the additional television receiver 124 with an associated horizontal sync separator 126. This feature eliminates the necessity of sending the reference frequency $$\frac{f_1}{Z}$$

(in Figure 7) over the line with the subsequent need of its filter separation at the transmitter B location. As in Figure 7, Figure 8 employs the neutralizing mixer 106 which receives neutralizing signal from the neutralizing frequency divider 108. The output of the 15,750 cycle per second generating circuit 110 of Figure 8, operating from the sync signal generator of transmitter B, then supplies the neutralizing frequency divider as well as the phase and frequency comparator with the necessary 15,750 cycles per second standard signal. It will be noticed that in Figure 8, the frequency of television transmitter B carrier is shown to be below that of television transmitter A for purposes of illustration, in order to make clear from Figure 7 and Figure 8 possible arrangements for the station and frequency distribution system of Figure 5.

In the practice of the present invention, it may be found that it is desirable in a given reception zone to establish the carrier difference in accordance with the synchronizing signal belonging to the radio transmitter establishing the strongest signal strength in the reception zone. In other words, it may be advantageous to control the neutralizing type interference pattern reproduced on the television screen in accordance with the signal transmitting the desired image. Correspondingly, in line with this mode of operation, it may be further desirable to establish synchronism between the signal generators of the involved stations and in this way, the neutralizing interference pattern will always be in synchronism with the desired reproduced image. For such purposes, a synchronizing system 124 in Figure 8 has been shown in dotted lines to represent its optional connection between the sync signal generator 85 of television transmitter A with the sync signal generator 87 of television transmitter B. Typical circuits for a synchronizing system suitable for use in the block 124 are shown in a co-pending application by J. R. De Baun, entitled "Electrical Timing Comparator Circuit," Serial No. 68,236 filed December 30, 1948, which application ripened on October 9, 1951, into Patent No. 2,570,775.

Although in the above description of the present invention the difference frequency or beat between co-channel carriers has been conveniently related to the horizontal synchronizing component of at least one of the involved composite television signals, it will be clear from an understanding of the invention's mode of operation that the frequency difference established between co-channel stations does not necessarily have to bear a synchronous relationship with composite television signal components. Since the neutralizing of interference effects is based upon the rather non-critical persistence of vision characteristics of the eye, it is not always necessary, although it may be in some cases desirable, to maintain the difference frequency between the carriers with extreme exactitude. Correspondingly, in the illustration shown it may suffice to employ a separate free-running oscillator, perhaps of the crystal variety, in lieu of the frequency dividing circuit connected with the sync signal generator. In any event, a predetermined frequency difference will be maintained between co-channel stations involving the present invention, and the value of this frequency difference will be chosen in accordance with the neutralizing effects disclosed hereinabove.

From the foregoing, it is seen that the applicant has provided a simple, novel and effective system for the reduction of co-channel interference in television systems, as well as novel carrier control means for carrying out the operation of the system. Application of this system to present day television broadcasting will, as indicated, greatly simplify the problems of television channel allocations and station geographical assignments, as well as materially improve the quality of entertainment as witnessed by television receiver owners located in such co-channel interference zones.

What is claimed is:

1. In a television transmission system including at least first and second transmitters adapted for concomitant operation on the same television channel, each transmitter being modulated by composite television signals having a periodically recurring horizontal synchronizing signal component and each transmitter producing a detectable signal strength in a common receiving zone; an interference reducing arrangement comprising in combination: means for controlling the carrier frequency of the first transmitter in accordance with an applied control signal; carrier receiving apparatus for receiving the carriers of said first and second transmitters and for heterodyning the received carriers with one another to produce a beat frequency signal; a source of reference signal bearing a sub-harmonic relationship to the equivalent frequency of the horizontal synchronizing signal component of one of the transmitted composite television signals; means for comparing the frequency of said beat signal with that of said reference signal to produce a control signal; and means for applying said control signal to said carrier controlling means to maintain between said first and second transmitter carriers a substantially fixed frequency difference equal to the frequency of said reference signal.

2. A transmission system as defined in claim 1, wherein said reference signal is derived from a horizontal synchronizing signal generator utilized for the composite television signal.

3. An interference reducing arrangement for use in a television transmission system including at least first and second transmitters adapted for concomitant operation on the same television channel, each transmitter being modulated by composite television signals having a periodically recurring horizontal synchronizing signal component and each transmitter producing a detectable signal strength in a common receiving zone; said interference reducing arrangement comprising in combination: means for controlling the carrier frequency of the first transmitter in accordance with an applied control signal; a source of reference signal bearing an integral submultiple relationship to the equivalent frequency of the horizontal synchronizing signal component of one of the transmitted composite television signals; means for developing from said reference signal a control signal; and means for applying said control signal to said carrier frequency controlling means to maintain between said first and second transmitter carriers a substantially fixed frequency difference equal to the frequency of said reference signal.

4. An arrangement as defined in claim 3, wherein said reference signal is derived from a horizontal synchronizing signal generator utilized for the composite television signal.

5. In a television transmission system including at least first and second transmitters adapted for concomitant operation on the same television channel, each transmitter being modulated by composite television signals having a periodically recurring horizontal synchronizing signal component and each transmitter producing a detectable signal strength in a common receiving zone; an interference reducing arrangement comprising in combination: means for maintaining the carrier frequency of the first transmitter at a fixed predetermined value; and means for controlling the carrier frequency of the second transmitter to maintain between the first and second transmitter carriers a substantially fixed frequency difference having a value of frequency less than the equivalent frequency of the horizontal synchronizing signal component of one of the transmitted composite television signals.

6. In a television transmission system including at least first and second transmitters adapted for concomitant operation on the same television channel, each transmitter being modulated by composite television signals having a periodically recurring horizontal synchronizing signal component and each transmitter producing a detectable signal strength in a common receiving zone; an interference reducing arrangement comprising in combination: means for maintaining the carrier frequency of the first transmitter at a fixed predetermined value; and means for controlling the carrier frequency of the second transmitter to maintain between said first and second transmitter carriers a substantially fixed frequency difference bearing a sub-harmonic relationship to the equivalent frequency of the horizontal synchronizing signal component of one of the transmitted composite television signals.

7. An interference reducing arrangement for use in a television transmission system including at least first and second transmitters adapted for concomitant operation on the same television channel, each transmitter being modulated by composite television signals having a periodically recurring horizontal synchronizing signal component and each transmitter producing a detectable signal strength in a common receiving zone; said interference reducing arrangement comprising in combination: means for controlling the carrier frequency of the first transmitter in accordance with an applied control signal; a source of reference signal having a frequency value less than the equivalent frequency of the horizontal synchronizing signal component of one of the transmitted composite television signals; means for developing from said reference signal a control signal; and means for applying said control signal to said carrier frequency controlling means to maintain between said first and second transmitter carriers a substantially fixed frequency difference equal to the frequency of said reference signal.

8. Apparatus according to claim 1 wherein the frequency of said reference signal is substantially equal to one-half the equivalent frequency of one of the composite television signal horizontal synchronizing signal components.

9. Apparatus according to claim 1 wherein the frequency of said reference signal is substantially equal to one-quarter the equivalent frequency of one of the composite television signal horizontal synchronizing signal components.

10. In a television radio transmission system including at least first, second and third radio transmitters adapted for concomitant operation on the same television channel, each transmitter being modulated by composite television signals having periodically recurrent horizontal synchronizing signal components and each transmitter producing a detectable signal strength in a common receiving zone; an interference reducing arrangement comprising in combination: means for controlling the carrier frequency of the first and third transmitters in accordance with an applied control signal; means responsive to the frequency difference between the transmitted carriers of said first and second radio transmitters; means responsive to the frequency difference between the transmitted carriers of said second and third transmitted carriers; a source of reference signal having a predetermined integral relationship to the horizontal synchronizing signal component of one of said television transmitters; means coupled with said first and second carrier frequency difference responsive means and with said source of reference signal for developing a control signal for said first transmitter frequency controlling means such as to maintain said first transmitter carrier at a frequency above that of said second transmitter carrier; and means coupled with said second and third carrier frequency difference responsive means and with said source of reference signal for developing a control signal for said third radio transmitter frequency controlling means such as to maintain said third transmitter carrier at a fixed frequency below that of said second transmitter carrier; the frequency differences thereby established between said first and second transmitter carriers and between said second and third transmitter carriers being each equal to the frequency of said reference signal.

11. In a radio transmission system including at least first and second radio transmitters, a carrier frequency control arrangement comprising in combination: means for controlling the carrier frequency of the first transmitter in accordance with the characteristics of an applied control signal, carrier receiving apparatus for receiving the carriers of said first and second radio transmitters and for heterodyning each of the received carriers with a local oscillator to produce first and second intermediate frequency signals; means for heterodyning the first intermediate frequency signal with a converter signal having a fixed frequency to produce a beat indicating signal differing in frequency from that of said first intermediate signal by the value of said converter signal frequency; means for combining the so-developed beat indicating signal with the second intermediate frequency signal to produce a difference control signal having a frequency variation which is a function of the carrier frequency variation between said first and second radio transmitters; frequency dividing means adapted to divide said converter signal by a predetermined factor to produce a reference signal; means for transmitting said difference control signal and said reference signal over a communicating means directed to said first radio transmitter; means located at said first transmitter for separating said difference control signal from said reference signal; a source of carrier relating signal having a predetermined frequency; a mixing circuit adapted to mix said carrier relating signal with said difference control signal to produce a resultant signal; means for dividing the frequency of said resultant signal; and means for comparing the frequencies of said divided resultant signal and of said reference signal to produce a control signal for application to said frequency controlling means such as to maintain a fixed frequency difference between the first and second carriers equal to the frequency of said carrier relating signal.

ALDA V. BEDFORD.

References Cited in the file of this patent

UNITED STATES PATENTS

| Number | Name | Date |
|---|---|---|
| 1,926,169 | Nyquist | Sept. 12, 1923 |
| 1,928,793 | Poole | Oct. 3, 1933 |
| 2,085,424 | Goddard | June 29, 1937 |
| 2,094,113 | Affel | Sept. 28, 1937 |
| 2,195,103 | Urtel | Mar. 26, 1940 |
| 2,218,636 | Bruckner | Oct. 22, 1940 |
| 2,227,045 | Urtel | Dec. 31, 1940 |
| 2,288,025 | Pomeroy | June 30, 1942 |
| 2,329,339 | De Baun | Sept. 14, 1943 |
| 2,399,469 | Cook | Apr. 30, 1946 |
| 2,414,453 | France | Jan. 21, 1947 |
| 2,419,568 | Labin | Apr. 29, 1947 |
| 2,500,090 | Oman | Mar. 7, 1950 |
| 2,536,255 | Bedford | Mar. 26, 1950 |

FOREIGN PATENTS

| Number | Country | Date |
|---|---|---|
| 45,709 | France | Nov. 18, 1935 |
| | (1st Addition to No. 777,271) | |